United States Patent
Ilnisky

[11] Patent Number: 5,456,431
[45] Date of Patent: Oct. 10, 1995

[54] APPARATUS FOR SUPPORTING A TRASH BAG

[76] Inventor: Allen M. Ilnisky, 7437 Fieldcrest Ave., Winter Park, Fla. 32792

[21] Appl. No.: 129,320

[22] Filed: Sep. 30, 1993

[51] Int. Cl.⁶ .................................................. A63B 55/08
[52] U.S. Cl. .................... 248/98; 248/99; 248/150
[58] Field of Search .................... 248/98, 97, 99, 248/100, 101, 95, 129, 136, 150, 436, 166, 188.6

[56] References Cited

U.S. PATENT DOCUMENTS

| | | | |
|---|---|---|---|
| 1,923,816 | 8/1933 | Firl | 248/97 |
| 3,841,592 | 10/1974 | Witten | 248/97 X |
| 3,866,872 | 2/1975 | Burgess | 298/97 |
| 4,174,085 | 11/1979 | Ferreira et al. | 248/99 X |
| 4,312,489 | 1/1982 | Paetzold | 248/97 |
| 4,579,229 | 4/1986 | Porcaro | 248/166 X |
| 4,856,740 | 8/1989 | MacLeod et al. | 248/97 |
| 5,040,754 | 8/1991 | Dearman | 248/98 X |
| 5,161,768 | 11/1992 | Sarabin | 248/188.6 X |
| 5,213,145 | 5/1993 | Huang et al. | 248/97 X |

*Primary Examiner*—Ramon O. Ramirez
*Attorney, Agent, or Firm*—Steven C. Stewart; James H. Beusse

[57] ABSTRACT

An apparatus for supporting trash bags that prevents the trash bag from contacting the ground during transport. The apparatus includes a main vertically oriented member having a carrying assembly at its top end and a wheeled supporting base assembly at its bottom end. The carrying assembly holds and maintains the open end of the trash bag. The base assembly includes a horizontally oriented plate that is vertically aligned with the carrying assembly to prevent the closed end of the bag from contacting the ground.

1 Claim, 2 Drawing Sheets

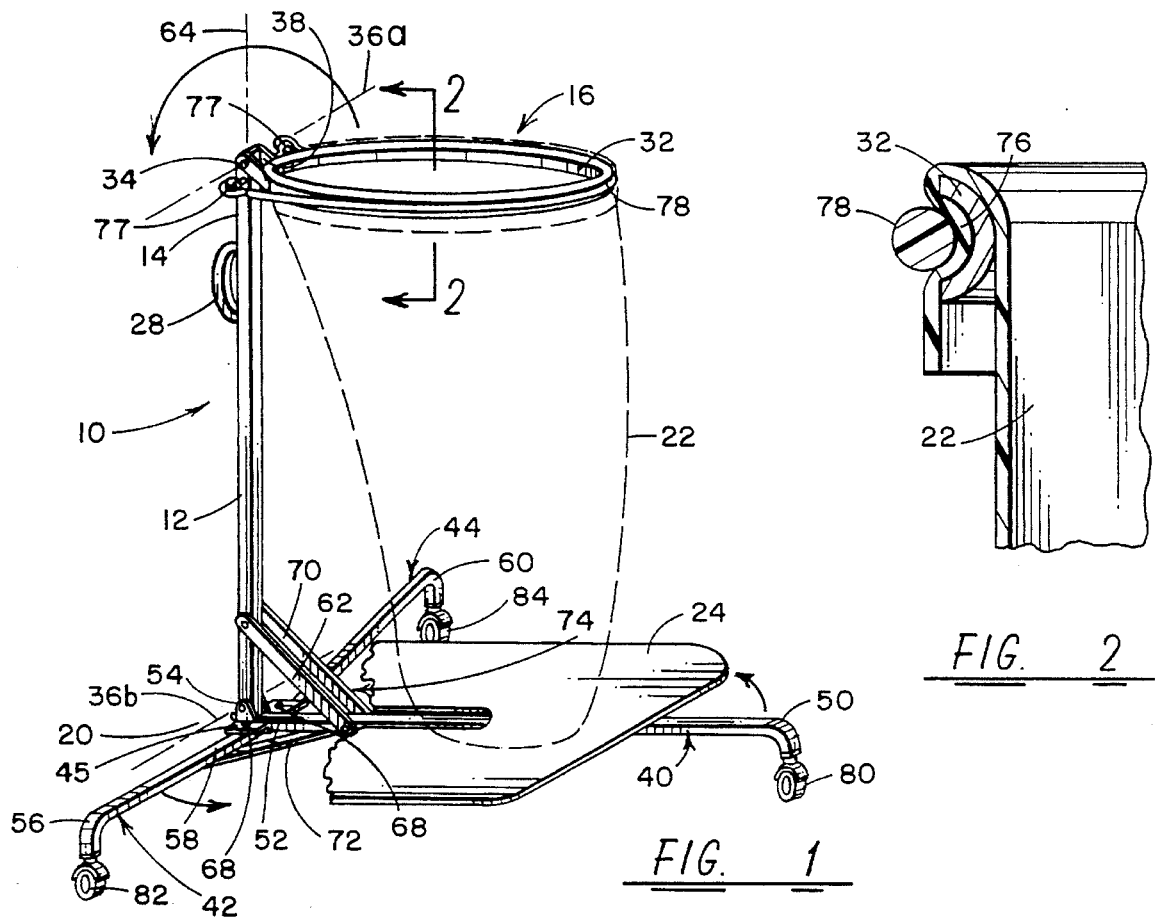
FIG. 1
FIG. 2
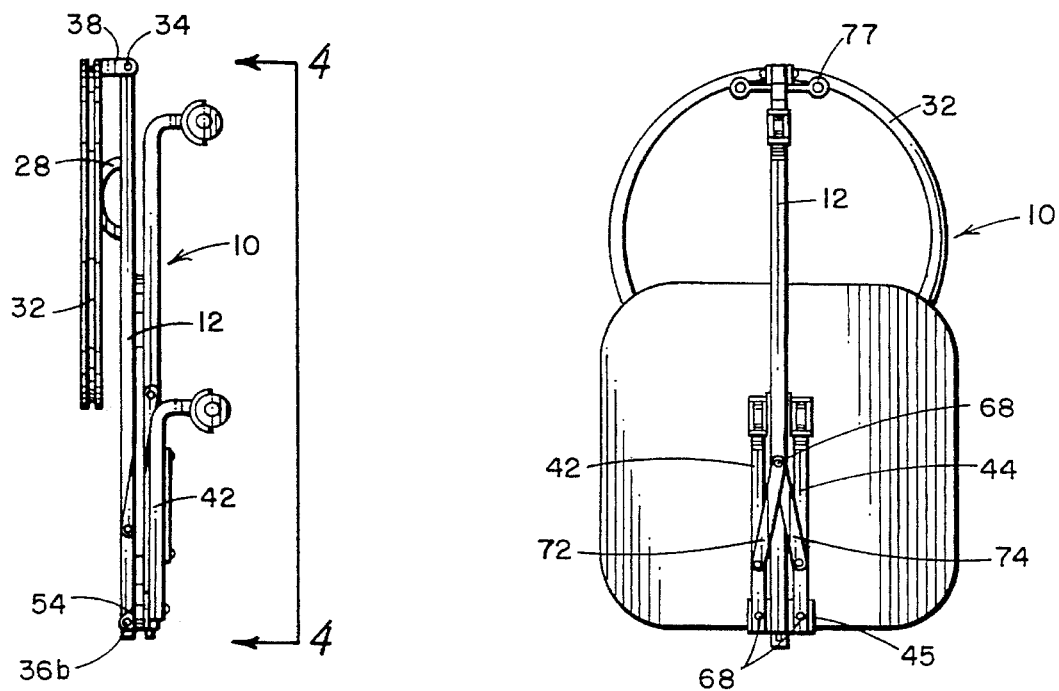
FIG. 3
FIG. 4

APPARATUS FOR SUPPORTING A TRASH BAG

BACKGROUND OF THE INVENTION

This invention relates to devices for holding trash and more particularly to devices for holding and transporting trash bags during yard work wherein the device can then be easily folded up and stored.

When cutting grass, trees and other foliage, the clippings are typically placed in the open end or mouth of a plastic trash bag. The trash bags are then accumulated and placed in a bin for disposal.

A drawback of trash bags is that they become heavy when they fill up and are then dragged on the ground. Consequently, when dragged over a rock, tree stump or sharp foliage, the bags may tear or rip thereby spilling their contents.

Another drawback to trash bags is prior to filling up, plastic trash bags are difficult to maintain in an open position, as there is no support to keep the mouth open. Thus, as a person is trying to fill up the bag with clippings, the clippings may tend to miss the bag and fall to the ground. Further, the person may have to continuously bend over and pick the bag off the ground as the bag is being filled.

SUMMARY OF THE INVENTION

An object of this invention is to provide an improved apparatus for holding and transporting trash bags.

A further object of this invention is to transport trash bags with an assembly that prevents the trash bag from contacting the ground.

Another object of this invention is to construct a device which holds a trash bag in a vertical and open position so that clippings can easily be placed into the bag even when the bag is empty.

An additional object of this invention is to form a portable trash bag holder assembly that can be folded up and placed in a small space.

And yet another object of this invention is to quickly and easily place a trash bag onto an assembly that will hold the mouth of the trash bag open when the bag is full.

These and other objects are provided with an apparatus for holding trash. The apparatus includes an elongated main member having a top portion and a bottom portion.

A carrying assembly extends perpendicularly away from and pivotally connected to said top portion for supporting the open end of the trash bag.

A base assembly extends horizontally away from and is pivotally connected to said bottom portion for supporting said main member in a vertical orientation. The base assembly has a center base member extending perpendicularly to said main member. A plate is attached to said center base member and has a horizontal orientation when said main member is supported in the vertical orientation The plate is substantially vertically aligned with said carrying means to engage the closed end of the trash bag and prevents the bag from contacting the ground during transport of the bag.

BRIEF DESCRIPTION OF THE DRAWINGS

FIG. 1 is a perspective view of the apparatus for holding a trash bag with bag shown in phantom;

FIG. 2 is a sectioned view of the annular ring and cord holding the trash bag along line 2—2 of FIG. 1;

FIG. 3 is a side view of the apparatus shown on FIG. 1 in its folded up position;

FIG. 4 is a front view of the folded up apparatus shown in FIG. 3 along line 4—4.

DESCRIPTION OF THE PREFERRED EMBODIMENTS

Figure 5:
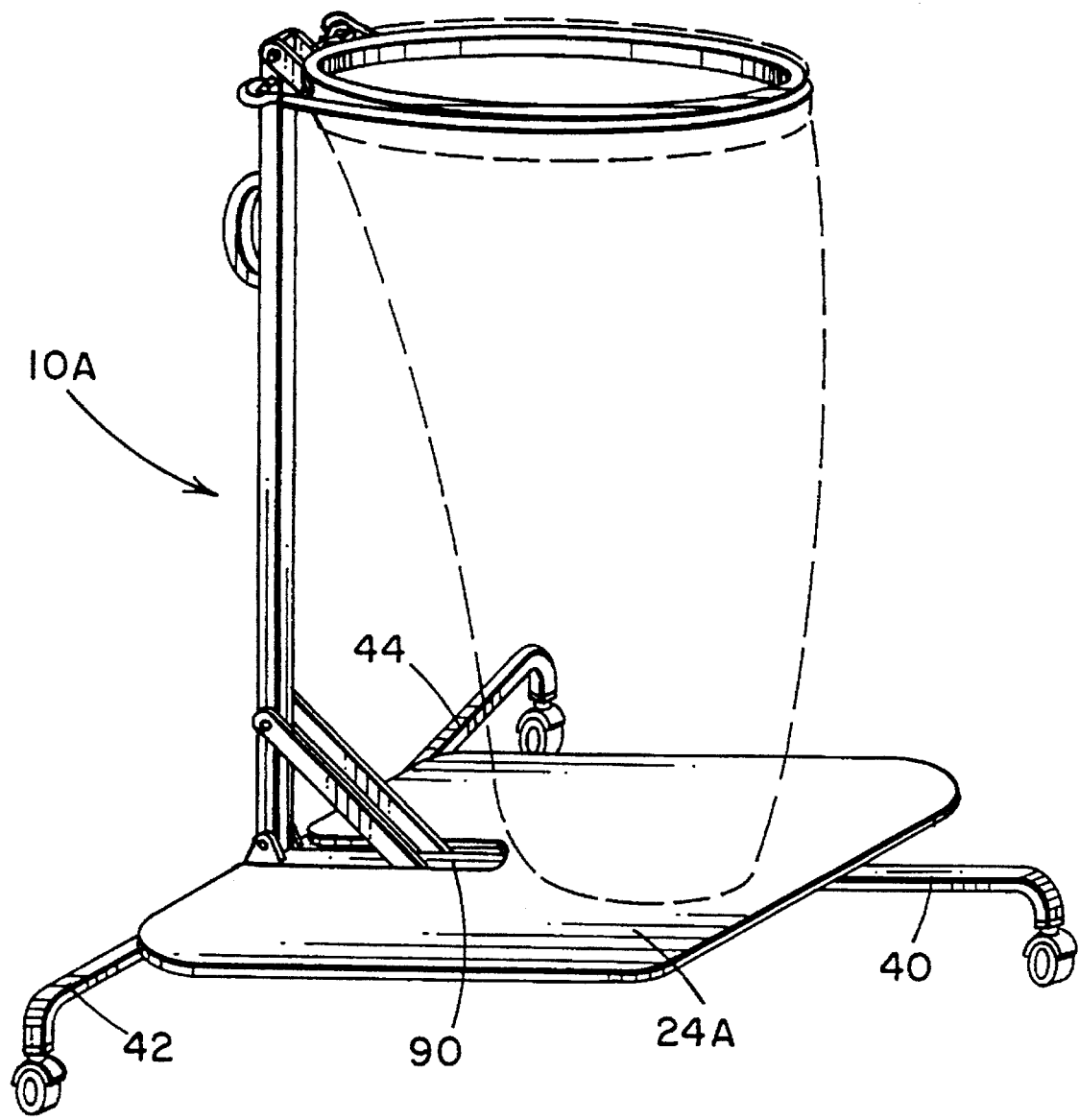
FIG. 5 is an alternate embodiment of the carrying assembly in FIG. 1 with an extended solid plate.

Referring to FIG. 1, there is shown the trash bag carrying assembly designated generally by number 10. The carrying assembly includes a elongated main member or frame 12 which is vertically oriented at having at its top portion 14 a horizontally oriented carrying assembly 16. Main member 12 is supported at its bottom portion 18 by a wheeled base assembly 20. Carrying assembly 16 supports the open end of a trash bag 22. Connected to base assembly 20 is horizontal plate 24 which is vertically aligned with carrying assembly 16 and supports the closed end 26 of trash bag 22 and prevents it from contacting the ground during transport.

Main member 12 is elongated and during its operation is vertically oriented. Attached to main member 12 adjacent top portion 14 is a handle 28 which can support carrying assembly 10.

Carrying assembly 16 includes an annular ring 32 which extends horizontally away from main member 12 and is connected to member 12 with pivot 34. Lateral axis 36a extends horizontally through the top portion 14 and lateral axis 36b extends horizontally through the bottom portion 18 of main member 12. Pivot 34 runs through lateral axis 36a and permits annular ring 32 to pivot upward and over main member 12 so that it can be folded up. Further details of this folding will be described in connection with FIG. 3 and 4. Annular ring 32 is held in a horizontally extending orientation with bracket 38.

Base assembly 20 includes center base member or frame 40, left base member or frame 42 and right base member or frame 44. Center base member or frame 40 has a distal end 50 and a proximate end 52. The proximate end 52 of center base member 40 is connected to main member 12 with pin 54 which extends through lateral axis 36b. Left base member 42 has a distal end 56 and a proximate end 58. Right base member 44 also has a distal end 60 and a proximate end 62. Extending longitudinally through main member 12 is axis 64. The proximate end of right base member 44 and left base member 42 are pivotally connected with bracket 45 to the proximate end 62 of center base member 40 with pins 68. Pins 68 extend parallel to longitudinal axis 64 so that the distal ends 56 and 60 of respective, left base member 42 and right base member 44 pivot horizontally about axis 64 toward center base member 40.

Struts 70 span between the bottom portion 16 of main member 12 and the proximate end 62 of base member 40 to limit the span between main member 12 and base member 40. Struts 70 maintain center base member 40 at an angle perpendicular to main member 12. Struts 70 fold by conventional means or slide in the slot (not shown) in center base member 40 when center base member 40 folds toward elongated main member 12. Similarly struts 72 and 74 span between left base member 42 and center base member 40 and right base member 44 and center base member 40. Struts 72 and 74 maintain left base member and right base member 42 and 44 at substantially perpendicular angles to center base member 40, as well as permit left base member 42 and right base member 44 to fold up and move their distal ends 56 and 60 toward center base member 40.

A horizontal plate 24 is attached using conventional techniques, such as fasteners or brackets, to a mid-portion of center base member 40. Horizontal plate 24 extends substantially horizontal and is vertically aligned with horizontal annular ring 32. Although a solid plate 24 is shown, it may be preferable that a plate constructed with a wire mesh, hard plastic, plastic mesh may be used instead which may be lighter and prevent susceptibility to tipping. It is also preferable that plate 24 be removable from base member 40.

Referring to FIG. 2, annular ring 32 contains a concave groove 76, which extends along the entire outside perimeter of annular ring 32. During operation, the open end of trash bag 22 is wrapped around annular ring 32 outside perimeter. A cord or rope, such as a bungee cord 78 is then wrapped around the outside perimeter of annular ring 32 in concave groove 76 and attach to eyelets 77 (FIG. 1) to hold the bag 22 in place. Referring to FIG. 1, the bottom portion of trash bag 22 is supported by horizontal plate 24 to prevent it from contacting the ground and becoming torn during transport.

Distal ends 50, 56 and 60 of center base member 40, left base member 42 and right base member 44 respectively, have wheels 80, 82 and 84 attached thereto. These wheels are attached by conventional means and provide enough support to base assembly 22 so that trash bag carrying assembly 10 can be rolled. Preferably, wheels are of sufficient size to permit carrying assembly 10 to be transported along grass or other surfaces.

Referring to FIG. 3 and FIG. 4, there is shown the trash bag carrying assembly 10 in a folded up position. To fold up carrying assembly 10, trash bag 22 is removed and horizontally extending annular ring 32 is rotated about pivot 34 so that handle 28 extends through ring 32. Further, left base member 42 and right base member 44 are pivoted about pin 54 toward center base member 40. Center base member 40 is then pivoted about pin 54 to rotate center base member along with left base member 42 and right base member 44 about lateral axis 36b. This permits carrying assembly 10 to be placed in a folded up position. Optionally, a bracket (not shown) may be attached adjacent handle 28 to main member 12 to support carrying assembly 10 on a wall, fence, post or other supporting structure.

Relating to FIG. 5, there is shown an alternate embodiment of carrying assembly 10, designated as 10A having an extended plate 24A. Plate 24A extends horizontally from center base member 40 over left base member 42 and right base member 44. Plate 24 has a slot 90 about its mid-portion to receive main member 12 and struts 70. Plate 24A is attached on its bottom side using removable fasteners to member 40 and rests on members 42 and 44. By extending plate 24 over members 42 and 44, it increases the stability of carrying assembly 10 and plate 24A.

This concludes the description of the preferred embodiments. A reading by those skilled in the art will bring to mind various changes without departing from the spirit and scope of the invention. It is intended, however, that the invention only be limited by the following appended claims.

What is claimed is:

1. An apparatus for carrying trash bags having an open end and a closed end, the apparatus comprising:

an elongated vertical main member having a top portion and a bottom portion;

a horizontally oriented annular ring extending from and pivotally connected to the top portion of the elongated main member, said ring being operative to pivot about an axis extending perpendicular to said main member, said ring having a circumferentially extending outer groove adapted for receiving an elastic band for supporting an open end of a trash bag inserted centrally of said ring with edges surrounding the open end being folded over said ring;

a center frame member having a proximate end and a distal end, said proximate end being pivotally attached to the bottom portion of the main member and extending perpendicularly therefrom in the direction of extension of said ring;

a left and right frame member each having a proximate end and a distal end, each said proximate end being pivotally attached to said vertical main member in a plane with said center frame member and extending substantially perpendicularly therefrom and generally oppositely perpendicularly from said center frame member, said left and right members being operative to pivot into parallel juxtaposed alignment with said vertical main member;

said left, right and center distal ends of said frame members being supported on wheels in a vertical orientation;

a horizontally oriented flat plate-like member removably attached to said center frame member, said flat plate-like member positioned on said center frame member in vertical alignment with said ring to support the closed end of the trash bag; and means for supporting said ring in a plane generally normal to said vertical main member and for preventing said ring from pivoting below said plane, said ring being pivotable upwardly into a generally vertical orientation upon removal of said elastic band whereby said open end of said trash bag can be closed and said trash bag removed from said apparatus without interference from said ring.

* * * * *